United States Patent
Zaitsu et al.

(10) Patent No.: US 8,169,729 B2
(45) Date of Patent: May 1, 2012

(54) MAGNETIC RECORDING/REPRODUCING USING A PATTERNED MEDIUM

(75) Inventors: Hideki Zaitsu, Kanagawa (JP); Hiroyasu Tanabe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 195 days.

(21) Appl. No.: 12/635,629

(22) Filed: Dec. 10, 2009

(65) Prior Publication Data

US 2010/0142077 A1    Jun. 10, 2010

(30) Foreign Application Priority Data

Dec. 12, 2008   (JP) ................. 2008-317050

(51) Int. Cl.
*G11B 5/09*   (2006.01)

(52) U.S. Cl. .......................................... 360/51; 360/48
(58) Field of Classification Search ................. None
See application file for complete search history.

(56) References Cited

U.S. PATENT DOCUMENTS

| | | | |
|---|---|---|---|
| 7,675,699 B2 * | 3/2010 | Albrecht | 360/48 |
| 2006/0119965 A1 | 6/2006 | Ohno | 360/51 |
| 2010/0118426 A1 * | 5/2010 | Vikramaditya et al. | 360/51 |

FOREIGN PATENT DOCUMENTS

| | | |
|---|---|---|
| JP | 2004/0199806 | 7/2004 |
| JP | 2006/0164349 | 6/2006 |

* cited by examiner

*Primary Examiner* — Jason Olson
(74) *Attorney, Agent, or Firm* — Zilka-Kotab, PC

(57) ABSTRACT

To synchronize a write/read frequency with media with high precision even when a write head is positioned in a different zone in a magnetic recording/reproducing device equipped with patterned media formed with writing hit patterns and having a zoned format function, a write head is positioned on a recording track in the vicinity of a boundary between zones, and the write head is positioned in a different zone from the zone in which the read head is positioned, the preamble pattern in the zone in which the read head is positioned is reproduced, a difference between frequencies of the preamble patterns of the zones is compensated to determine a write frequency used for writing data into a desired track, and then start timing for writing is determined based on a synchronization pattern obtained at the position of the read head. Other systems and methods are presented as well.

18 Claims, 10 Drawing Sheets

| Write head position Zone | Read head position Zone | α | Cfrq | Amount of Sync deviation |
|---|---|---|---|---|
| 0 | 0 | α00 | C00 | Sep(0,0) |
| 1 | 1 | α01 | C01 | Sep(0,1) |
|  | 1 | α11 | C11 | Sep(1,1) |
| 2 | 2 | α12 | C12 | Sep(1,2) |
|  | 2 | α22 | C22 | Sep(2,2) |
| 3 | 3 | α23 | C23 | Sep(2,3) |
|  | 3 | α33 | C33 | Sep(3,3) |
| 4 | 4 | α34 | C34 | Sep(3,4) |
|  | 4 | α44 | C44 | Sep(4,4) |
|  | 5 | α45 | C45 | Sep(4,5) |
| ... | ... | ... | ... | ... |

Fig. 8

MAGNETIC RECORDING/REPRODUCING USING A PATTERNED MEDIUM

RELATED APPLICATIONS

The present application claims priority to a Japanese Patent Application filed Dec. 12, 2008, under Appl. No. 2008-317050, which is incorporated herein by reference.

FIELD OF THE INVENTION

The present invention relates to magnetic recording/reproducing with hard disk drives, and specifically to magnetic recording/reproducing with hard disk drives using a patterned storage medium.

BACKGROUND OF THE INVENTION

Existing hard disk drives have used continuous media with a recording magnetic film uniformly and continuously sputtered thereon; however, attention is being given to patterned media as a next generation technology for writing and/or reading data at a higher recording density. Patterned media are media with physically separated recording tracks and/or bit patterns formed on its storage surface. In comparison with the recording performance of the existing continuous media, the patterned media provide advantages through improvements in recording transition shape, a reduction in media noise at edges of recording tracks, a reduction in crosstalk from adjacent tracks, and other effects. However, the timing to start writing and reading is determined depending on the patterned media, and therefore magnetic recording/reproducing devices using patterned media are required to have a more precise write timing control function than that of magnetic recording/reproducing devices using conventional existing media.

When a magnetic recording/reproducing device using an existing continuous medium writes data, the device writes patterns, called "preamble" and synchronization or "sync," for adjusting read frequencies and phases at the beginning of a data sector in which the data is written, and subsequently writes a data pattern. Since the frequency (clock) and phase of the data pattern to be written are not obtained from feedback on the rotational speed variable of the medium and the relative position between the head and medium, the data bits are not always written on precisely the same position on the medium. In other words, the writing operation of data is not synchronized with the medium at the bit level. On the other hand, the reading operation is performed by adjusting a reproduced clock and phase with the use of the preamble and sync patterns written in the beginning of the data sector.

In contrast to this, a magnetic recording/reproducing device using a patterned medium with physical bit formed thereon is used to synchronize with the bit pattern on the medium with great precision in order to write and read data. One of these approaches is disclosed in Japanese Patent Office (JPO) Pub. No. 2004-199806 representing a method for pre-patterning timing marks for writing on media. A method for adjusting the phase of a medium and a recording pattern is disclosed in JPO Pub. No. 2006-164349, which presents a method for learning and determining the time (phase) between the pre-patterned timing mark and the starting point of writing.

Further increases in the capacity of a hard disk device using patterned media necessarily involve the aforementioned precise writing synchronization between patterns on the media and the head. The writing timing synchronization with the media mainly needs two adjustments: a write/read frequency adjustment for compensating write/read frequency fluctuations caused by the rotational speed fluctuations of the medium, the variations in bit patterning apparatuses and so on; and a phase adjustment for compensating the starting point of bits.

In addition, general hard disk devices employ zone formatting for the purpose of allocating a large volume of data. This is a format in which a storage medium is divided along the radius into a plurality of areas (zones), each having a different write frequency and recording density. Typical storage media has a higher recording density and a lower write frequency toward the radially inner zones and a lower recording density and a higher write frequency toward the radially outer zones. This is because the relative linear velocity of the medium to the head decreases toward the radially inner zones and therefore those zones are less affected by band noises, while the relative linear velocity increases toward the radially outer zones and therefore those zones are more affected by band noises. The frequency of the data pattern formed on such a zone-formatted patterned medium discretely changes at its zone boundaries. Also, the head used for the patterned media includes a write element and a read element separated from each other. The write element and read element rotating around a shaft while moving along the radius over the medium possibly involve radial misalignment between the write head and the read head according to where they are positioned on the radius. Due to this, even when the write head is positioned on a track to be written with data, the read head reads information on a different track. If, in order to synchronize the bit pattern on a medium with the writing position of a head, for example, a pattern for providing write timing is formed on the medium upon the manufacture of the medium and signals are reproduced from the pattern to adjust the write timing, as disclosed in JPO Pub. No. 2004-199806, the bit frequency of a recording track in the vicinity of a zone boundary differs from the frequency and phase of the signals reproduced at a position where the read head is currently positioned, and therefore proper writing is impossible.

Therefore, it would be beneficial to have a hard disk device which can use a patterned medium enabling highly-precise control and zoned-bit recording, which alleviates the problems generally associated with such media usage.

SUMMARY OF THE INVENTION

In one embodiment, a magnetic recording/reproducing device includes a patterned magnetic storage medium. The patterned magnetic storage medium includes a timing pattern area having a preamble pattern used to adjust write and/or read frequencies and a synchronization pattern used to adjust write and/or read phases, and a data area having a bit pattern used to store data. The magnetic recording/reproducing device also includes a medium driving unit for driving the patterned magnetic storage medium, a magnetic head having at least one of a write head and a read head, and a head driving unit for positioning the magnetic head at a desired track on the patterned magnetic storage medium. The preamble pattern and the synchronization pattern in the timing pattern area are commonly used to write and/or read data, and when the read head is positioned on a desired track containing data to be read and data is to be written on the desired track, the preamble pattern and the synchronization pattern are reproduced at the same position in the timing pattern area to adjust read timing and/or write timing based on a reproduced waveform of the preamble pattern and the synchronization pattern.

In another embodiment, a method includes commonly using a preamble pattern and a synchronization pattern in a timing pattern of a patterned magnetic storage medium to write and/or read data, and reproducing the preamble pattern and the synchronization pattern at the same position in the timing pattern area to adjust read timing and/or write timing based on a reproduced waveform of the preamble pattern and the synchronization pattern when a read head is positioned on a desired track containing data to be read from and data is to be written on the desired track.

A magnetic recording/reproducing device according to yet another embodiment includes a patterned magnetic storage medium, including: a timing pattern area having a preamble pattern used to adjust write and/or read frequencies and a synchronization pattern used to adjust write and/or read phases, and a data area having a bit pattern for storing data. The device also includes a medium driving unit for driving the patterned magnetic storage medium; a magnetic head having at least a write head and a read head; a head driving unit for positioning the magnetic head at a desired track on the patterned magnetic storage medium; logic for commonly using the preamble pattern and the synchronization pattern in the timing pattern area when writing and/or reading data, and logic for causing reproduction of the preamble pattern and the synchronization pattern at the same position in the timing pattern area to adjust read timing and/or write timing based on a reproduced waveform of the preamble pattern and the synchronization pattern when the read head is positioned on a desired track containing data to be read and data is to be written on the desired track.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 8 illustrates an example of information stored in a memory, according to one embodiment.

DETAILED DESCRIPTION

Figure 1:
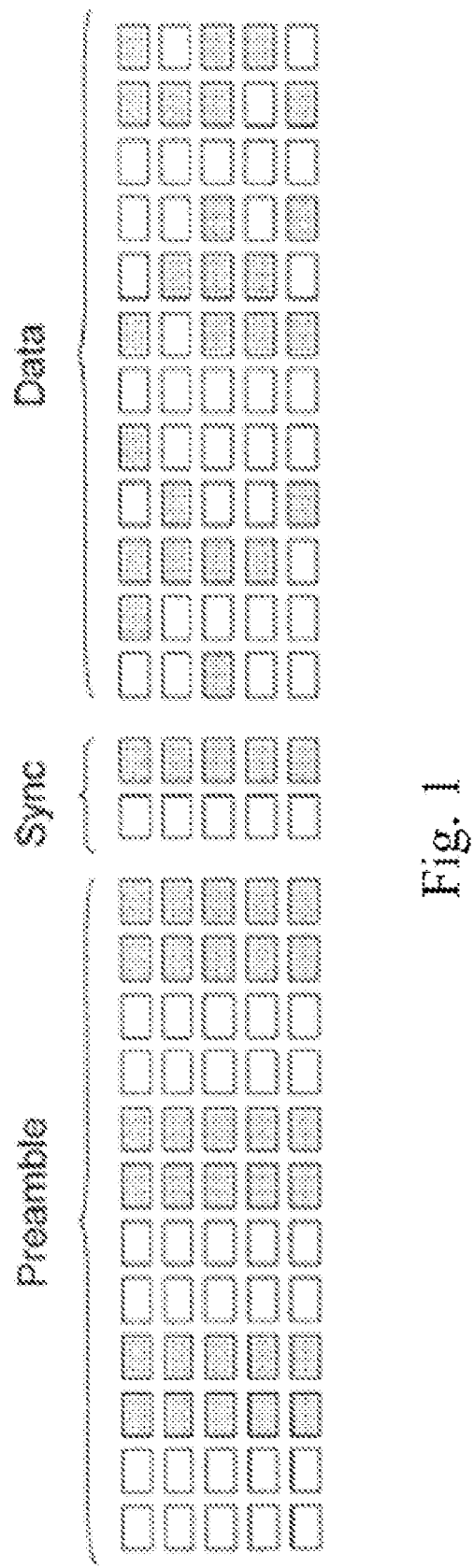
FIG. 1 illustrates an example of patterns on patterned media.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "art" and "the" include plural referents unless otherwise specified.

In one general embodiment, a magnetic recording/reproducing device includes a patterned magnetic storage medium. The patterned magnetic storage medium includes a timing pattern area in which a preamble pattern used to adjust write and/or read frequencies and a synchronization pattern used to adjust write and/or read phases are formed, and a data area in which a bit pattern used to store data is formed. The magnetic recording/reproducing device also includes a medium driving unit for driving the patterned magnetic storage medium, a magnetic head having a write head and/or a read head, and a head driving unit for positioning the magnetic head at a desired track on the patterned magnetic storage medium. The preamble pattern and the synchronization pattern in the timing pattern area are commonly used to write and/or read data, and when the read head is positioned on a desired track containing data to be read and data is to he written on the desired track, the preamble pattern and the synchronization pattern are reproduced at the same position in the timing pattern area to adjust read timing and/or write timing based on a reproduced waveform of the preamble pattern and the synchronization pattern.

In another general embodiment, a method includes commonly using a preamble pattern and a synchronization pattern in a timing pattern of a patterned magnetic storage medium to write and/or read data, and reproducing the preamble pattern and the synchronization pattern at the same position in the timing pattern area to adjust read timing and/or write timing based on a reproduced waveform of the preamble pattern and the synchronization pattern when a read head is positioned on a desired track containing data to be read and data is to be written on the desired track.

In yet another general embodiment, a magnetic recording/reproducing device includes a patterned magnetic storage medium, including: a timing pattern area having a preamble pattern used to adjust write and/or read frequencies and a synchronization pattern used to adjust write and/or read phases, and a data area having a bit pattern for storing data. The device also includes a medium driving unit for driving the patterned magnetic storage medium; a magnetic head having at least a write head and a read head; a head driving unit for positioning the magnetic head at a desired track on the patterned magnetic storage medium; logic for commonly using the preamble pattern and the synchronization pattern in the timing pattern area when writing and/or reading data, and logic for causing reproduction of the preamble pattern and the synchronization pattern at the same position in the timing pattern area to adjust read timing and/or write timing based on a reproduced waveform of the preamble pattern and the synchronization pattern when the read head is positioned on a desired track containing data to be read and data is to be written on the desired track. The logic may be implemented in hardware and/or software, in a manner known in the art.

A magnetic recording/reproducing device, according to one embodiment, employs a patterned medium including a timing pattern area formed with a preamble pattern for adjusting write/read frequencies and a sync pattern for adjusting write/read phases and a data area formed with a bit pattern for writing data, and uses the preamble pattern and sync pattern in the timing pattern area both for writing data and reading data. More specifically, when data is read while a read head is positioned on a desired track and when data is written while the read head is positioned on the same track as the track containing the data to be read, reproduction of the preamble pattern and sync pattern at the same position in the timing pattern area is started to adjust read timing and write timing based on the same reproduced waveform of the preamble pattern and sync pattern.

The patterned medium, according to one embodiment, is a zone-formatted medium that is divided into zones in a direction of a radius of the medium, each zone having a data area provided with a bit pattern formed at a constant recording density or write/read frequency. A frequency acquired from the reproduced waveform of the preamble pattern is compensated with the use of a ratio between a bit frequency of a zone where the read head is and a bit frequency of a zone where the write head is to obtain a write frequency, and a writing operation is performed on the data area based on the write frequency. For the compensation, a memory storing compensation amounts for the write frequency may be provided, the compensation amounts corresponding to the zone in which the read head is positioned and the zone in which the write head is positioned, thereby compensating the write frequency with the compensation amount information stored in the memory. If the read head is positioned in the vicinity of a boundary of zones at the time of writing data and proper frequency information cannot be obtained because preamble patterns in two adjacent zones are simultaneously reproduced, the track at which the write head is currently positioned may be defined as a write inhibited track.

In the zone-formatted medium, according to one embodiment, the track recording density or read signal frequency of the preamble pattern and sync pattern may be the same across all zones. This may be realized, for example, by making bit patterns composing the preamble pattern and sync pattern continuous and unbroken in the direction of the width of tracks. In the case of the zone-formatted medium, a write clock frequency is compensated with a ratio between bit length of the preamble pattern in the track at which the read head is positioned and bit length of the data area at which the write head is positioned, and a writing operation is performed based on the compensated frequency. For the compensation, a memory storing compensation amounts for the write clock frequency may be provided, the compensation amount information corresponding to the zone in which the read head is positioned and the zone in which the write head is positioned.

According to some approaches, zoned-bit recording may be realized by magnetic recording/reproducing devices with patterned media. With reference to the drawings, embodiments of the present invention are described below.

According to one embodiment, a patterned medium has a servo area, a timing pattern area, and a data area, the timing pattern area including a preamble pattern for adjusting write/read frequencies and a sync pattern for adjusting write/read phases. A servo pattern in the servo area and the preamble pattern and sync pattern in the timing pattern area are formed on the medium as patterns of physically separated bits that are formed during the manufacture of the medium. In the data area is also a pattern of physically separated bits, each being equivalent to one bit.

FIG. 1 shows bit patterns of a preamble sector, sync sector and data sector on a medium used in one embodiment. Shades of respective bits represent magnetization directions, and the magnetization of each bit on a perpendicular recording/reproducing medium is perpendicularly oriented to a surface of the medium. The bits in the preamble and sync sectors are magnetized during the manufacture of the medium or after the assembly of the medium into the device, and these sectors are not written during writing and reading operations of general user data. The preamble pattern is formed on the medium as a repetitive pattern of a constant frequency, and its reproduced waveform is similar to a sine wave. The sync pattern is a predetermined pattern and, for example, may be a dipulse pattern, as shown in FIG. 1.

Figure 2:
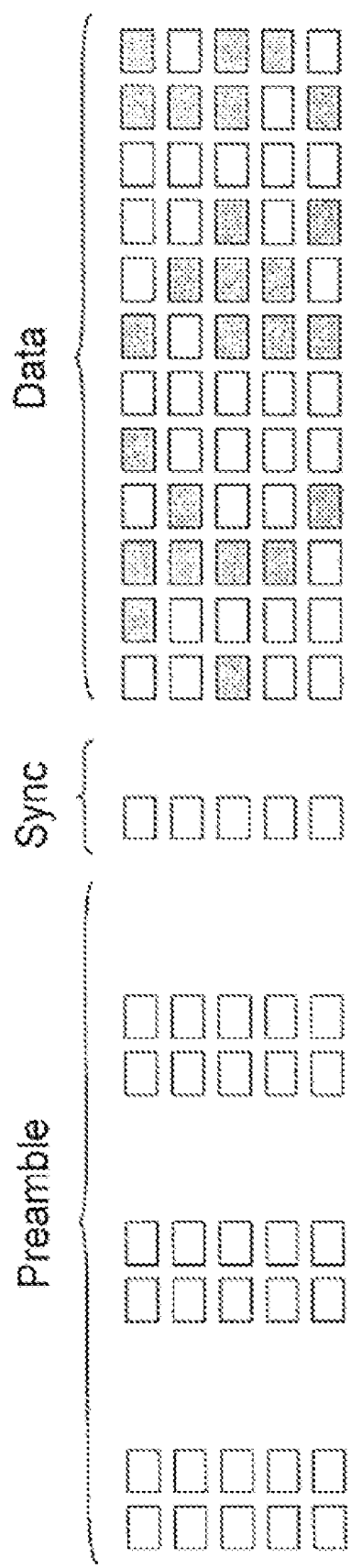
FIG. 2 illustrates an example of patterns on patterned media in which a write operation is performed based on the presence or absence of the preamble and sync pattern, according to one embodiment.

From the point of view of magnetizing the preamble and sync patterns, as shown in FIG. 2, it is easier to orient the magnetization of these sectors in one direction and to form the preamble and sync patterns with and without bits. The parts devoid of bits in FIG. 2 are where a recording layer is removed, and application of a uniform magnetic field oriented in one direction to the medium may easily magnetize the preamble and sync bits. Writing user data into the data sector is performed with magnetization oriented in the upward or downward direction which is perpendicular to the surface of the median.

Figure 3:
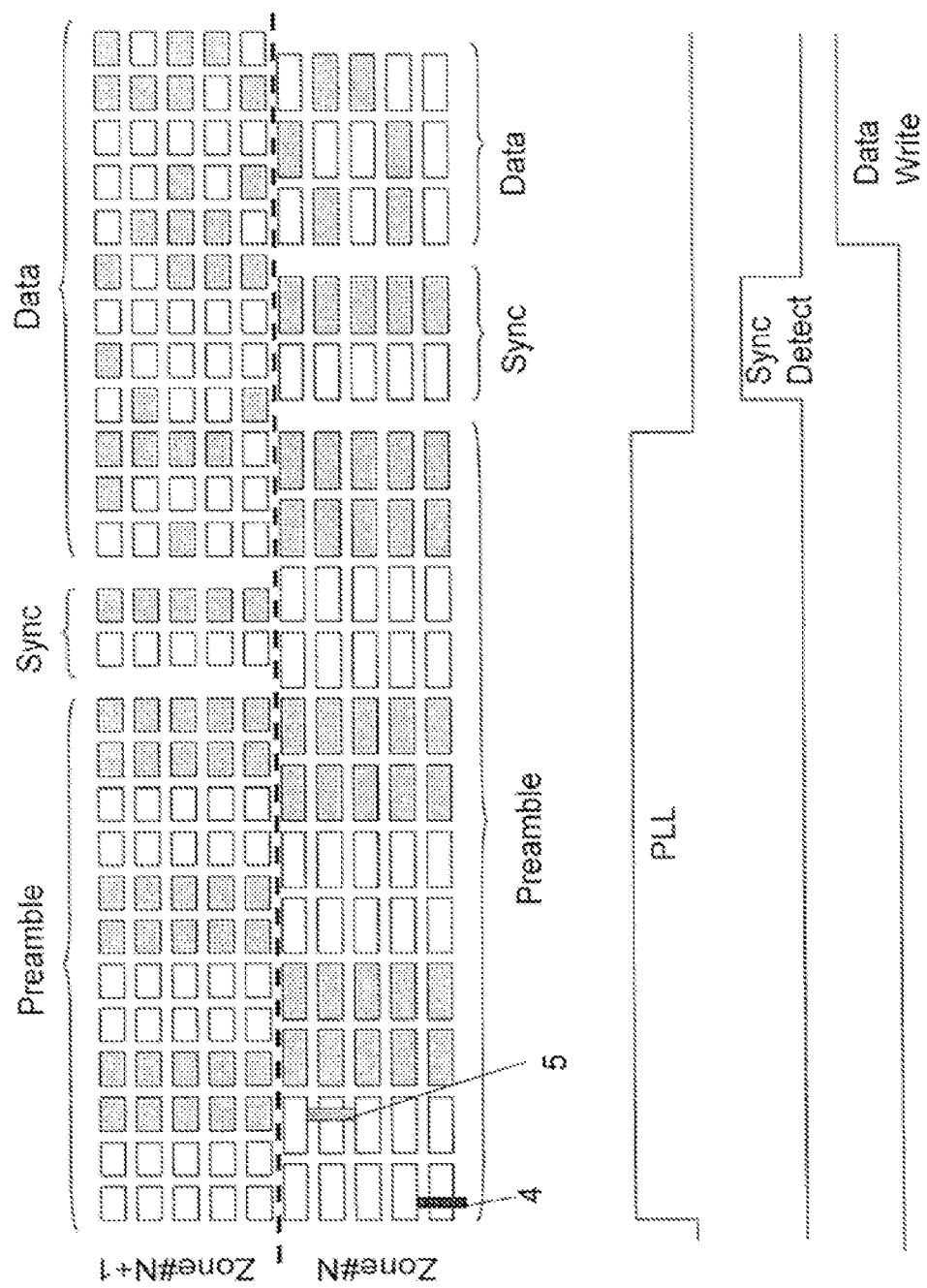
FIG. 3 is an exemplary view for explaining a write operation when a write head and a read head are positioned in the same zone, according to one embodiment.
Figure 4:
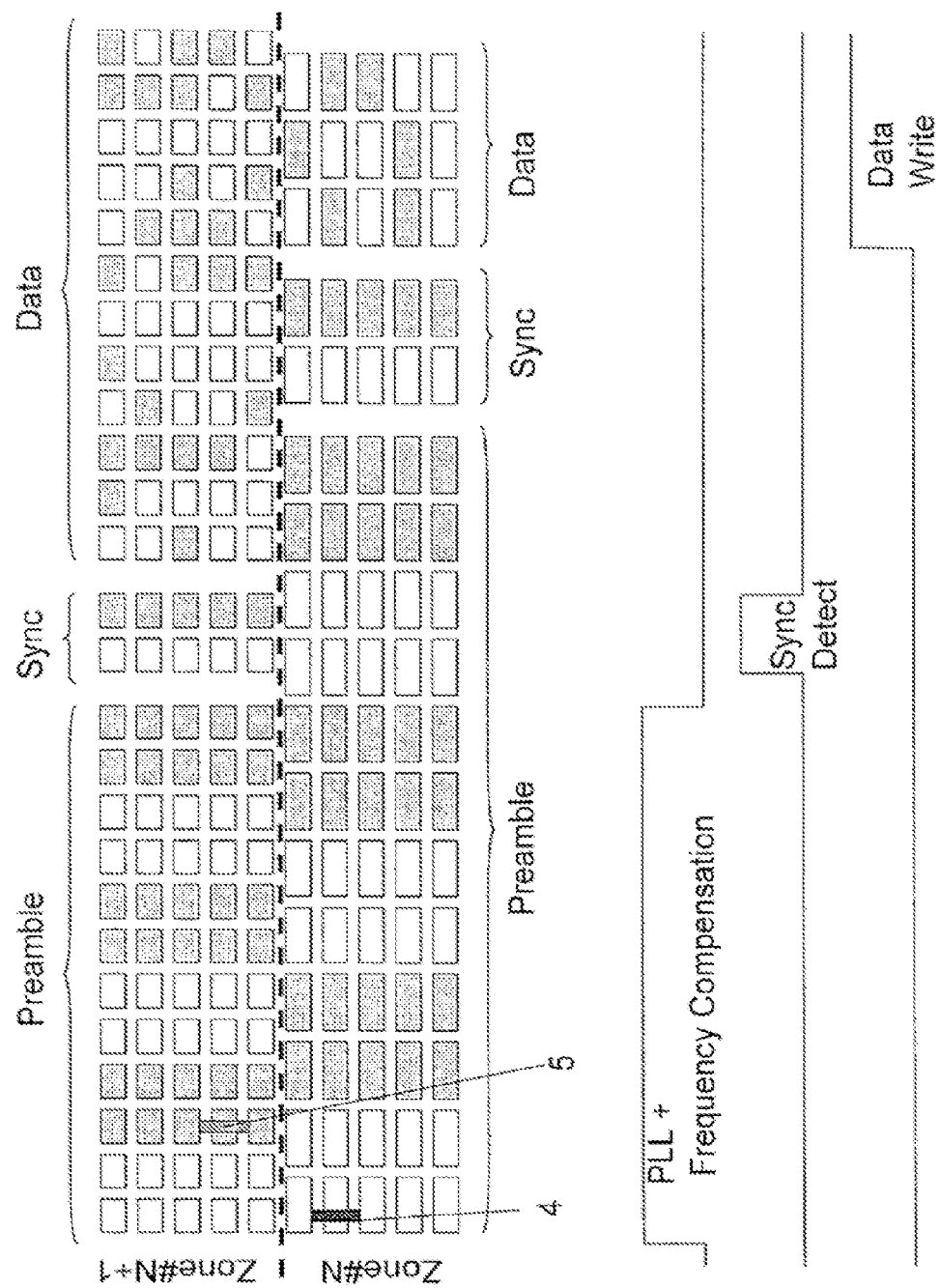
FIG. 4 is an exemplary view for explaining a write operation when the write head is positioned in a different zone from the zone in which the read head is positioned, according to one embodiment.

Next, a method for writing to the media in FIGS. 1 and 2 is described. In a case where a write head 4 and a read head 5 are within the same zone as shown in FIG. 3, a frequency used for writing is acquired from the reproduced waveform of the preamble pattern before performing a writing operation. After the acquisition process for the frequency by a phase-locked loop (PLL) circuit, a data clock frequency is locked and data writing starts after waiting for a time from the point in which a signal of the sync pattern is obtained as a reproduced signal to a starting point of the data bits. On the contrary, as shown in FIG. 4, in a case where the write head 4 is positioned on a recording track in the vicinity of a zone boundary and the write head 4 is in a different zone from the zone where the read head 5 is, the preamble pattern at which the read head is positioned is reproduced, the frequency difference between the preamble patterns in the different zones are compensated to determine a write frequency necessary to write data into a desired track, and then, writing start timing is determined based on the sync pattern in the track at which the read head 5 is positioned. Although the preamble in Zone #N and Zone #N+1 start from the same point in FIG. 4, some preamble sectors start differently between zones. This issue may be resolved by using the preamble and sync in the prior sector to the sector to be written before determining the write timing.

For reading data, the read head 5 is controlled to follow the track in which desired data has been stored regardless of the radius position and head. Data reading may be performed by reproducing the preamble in the same track in which the desired data is stored, acquiring a frequency from the reproduced preamble, and detecting the sync pattern, thereby enabling data reading/decoding in the same reading method as the conventional one.

Figure 5:
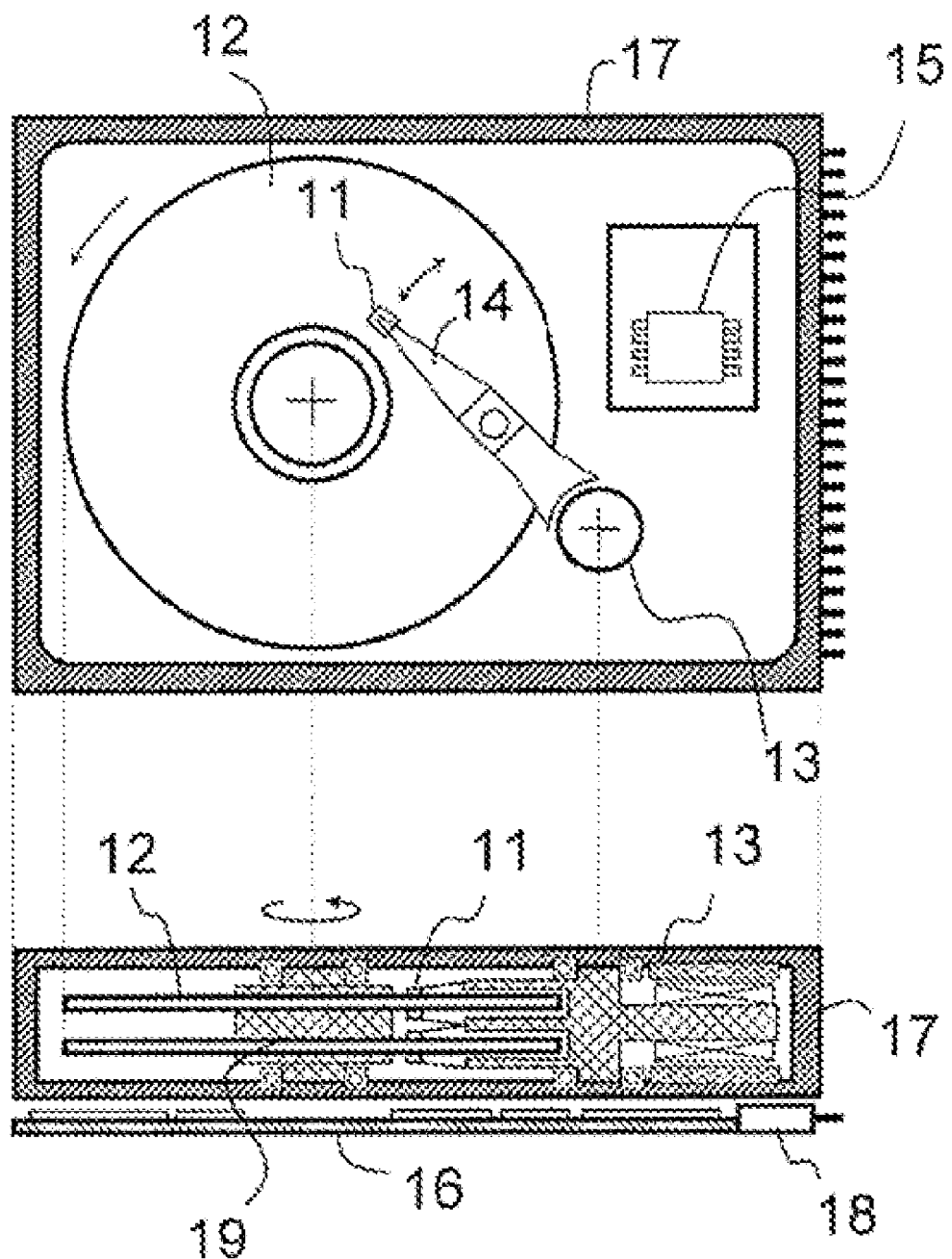
FIG. 5 is an exemplary configuration diagram of a magnetic storage device, according to one embodiment.

FIG. 5 shows a schematic view of a hard disk drive. One or multiple heads 11, and one or multiple storage media 12 are arranged in a case 17. The storage media are rotated by a spindle motor 19. A write head and a read head are mounted on the head 11. The head 11 is driven by a voice coil motor 13 and moves along the radius of the media. Data is written on the storage medium 12 by positioning the head 11 onto a target track and applying recording current from a preamplifier 15 to the write head. Data is read by transmitting signals reproduced by the read head to the preamplifier 15 where amplifies the signals and decodes them in a read channel.

The storage medium 12 used in the hard disk drive, according to one embodiment, is a patterned medium, as shown in FIG. 1 and FIG. 2, with previously formed preamble and sync patterns including magnetization information and physically formed track patterns or bit patterns. The patterned medium is divided into zones in the radius direction. Each zone has a different bit density.

Figure 6:
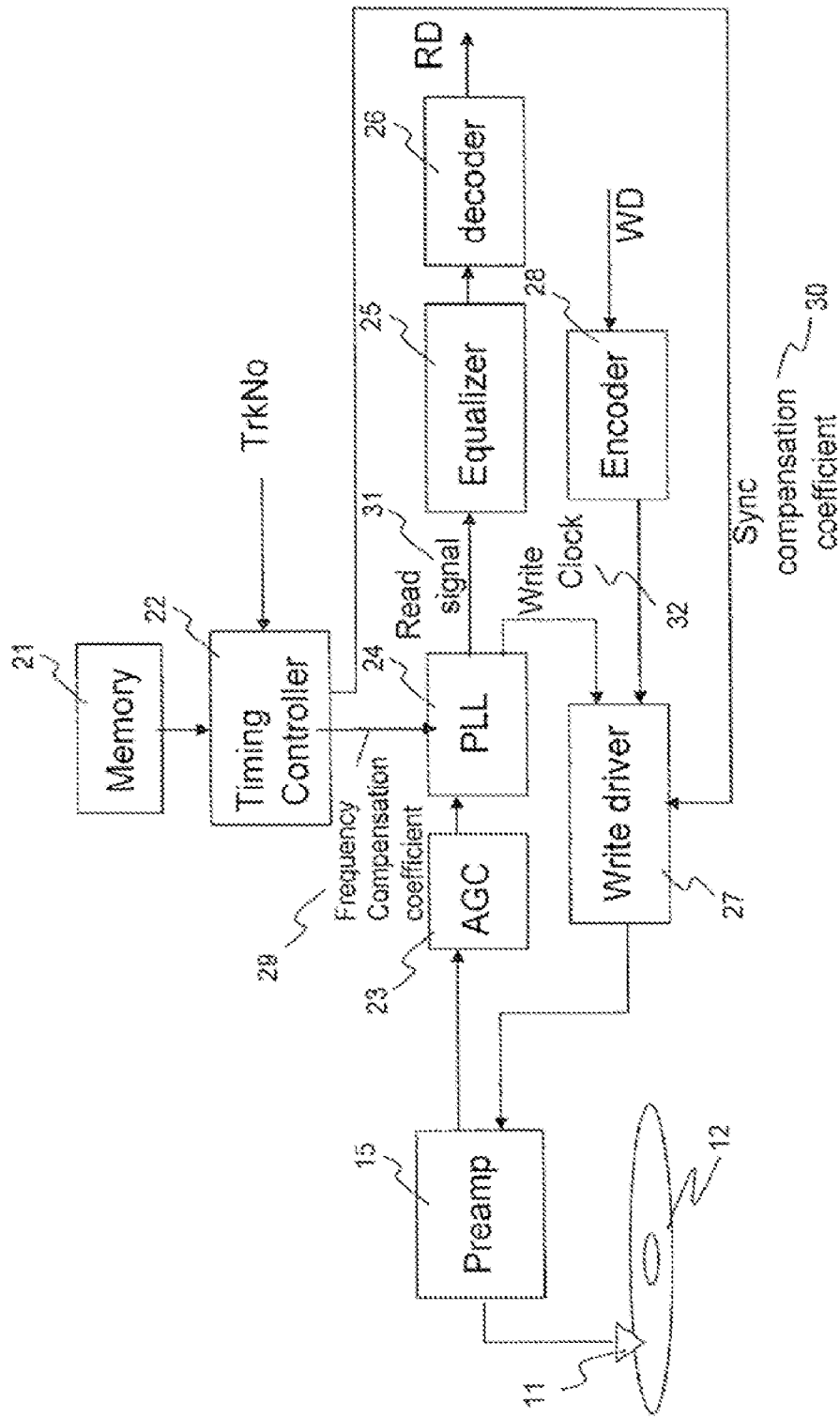
FIG. 6 is an exemplary block diagram of a system, according to one embodiment.

FIG. 6 shows a block diagram of a system. In a writing operation, the preamble pattern is at first reproduced, and the reproduced signal is subjected to gain adjustment by an automatic gain control (AGC) 23 and an acquisition process by the PLL 24 to acquire a frequency and phase. The PLL 24 is fed with a frequency compensation coefficient 29 read out from a memory 21 by a timing controller 22. After compensating a clock frequency acquired from the reproduced signal of the preamble with the use of the frequency compensation coefficient 29, the compensated clock is fed as a write clock 32 to a write driver 27. On the other hand, written data WD is encoded by an encoder 28 and is also fed to the write driver 27. In addition, a sync compensation coefficient 30 is transmitted from the timing controller 22 to the write driver 27. Upon detection of the sync, the writing operation starts with a phase and frequency calculated from the sync compensation coefficient 30, and data is written onto the patterned medium 12 through the preamplifier 15 and head 11.

Figure 7:
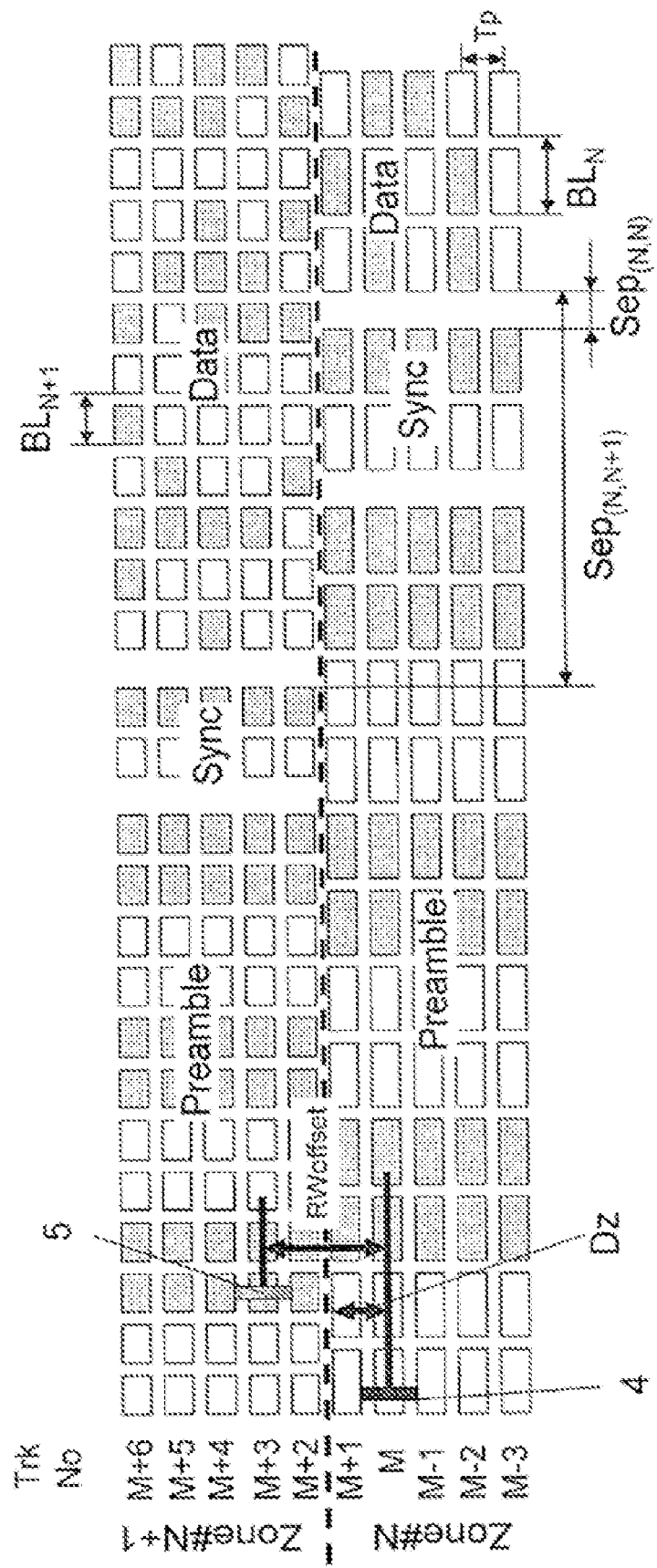
FIG. 7 is an exemplary view for explaining the calculation of a frequency compensation coefficient, according to one embodiment.

The timing controller 22 is a module for reading a frequency and sync compensation coefficient corresponding to a recording track number and head number from the memory 21 and transmitting them to the PLL 24 and write driver 27. The frequencies and sync compensation coefficients corresponding to each recording track are determined as shown in FIG. 7.

The write head 4 is deviated from the read head 5 along the radius of the medium, and the amount of deviation between the write head 4 and read head 5 is defined as $RW_{offset}$. The value of $RW_{offset}$ varies by position on the radius and by head. When the recording track number is specified, the distance between the recording track and an adjacent zone may be calculated from the number of the track positioned at an edge of the adjacent zone and a track pitch (Tp), with the distance being Dz. Let the bit length of Zone #N and Zone #N+1 be denoted as $BL_N$, $BL_{N+1}$, respectively, a frequency compensation coefficient Cfrq is defined by Equation 1.

$$Cfrq = \begin{cases} BL_{N+1}/BL_N & (RW_{offset} \geq Dz+\alpha) \\ 1 & (RW_{offset} \geq Dz+\alpha) \\ No\,use & (Dz-\alpha < RW_{offset} \geq Dz+\alpha) \\ & 0 \leq \alpha/Tp \leq 0.5 \end{cases} \quad \text{Equation 1}$$

A symbol "α" in Equation 1 is a constant for preventing the PLL 24 from failing to work properly due to two zones' signals that are simultaneously reproduced by the read head 5 positioned on a boundary of zones, and takes on a value from 0<α/Tp<0.5. Because the mixed reproduced signals of both the zones may cause malfunctions of the PLL, tracks that satisfy the relationship Dz−α<$RW_{offset}$<Dz+α are not used to write or read data and are registered as bad sectors. More specifically, as to conversion of a logical address into a physical address, the logical address that indicates a sector in a track to be usually used for writing/reading data is not converted into a physical address of a corresponding data sector, but is converted into a physical address indicating a spare data sector that is to be used to write/read the data in a spare data section area. If α is set to 0, all tracks may be used to write/read data; however, this may cause malfunctions of the PLL, resulting in improper writing operations and data loss. To avoid this, α is set to as small as possible within a normal operating range of the PLL. In addition, α may not be a constant and may be different values from zone to zone, for example.

If a read head is in a different zone from the zone a write head is in ($RW_{offset} \geq Dz+\alpha$), the frequency compensation coefficient is given by Cfrq=$BL_{N+1}/BL_N$. If the read head and write head are in the same zone ($RW_{offset} \leq Dz-\alpha$), the frequency compensation coefficient Cfrq=1. Let the frequency acquired from a signal of the preamble be denoted as $FRQ_{pre}$, the write clock frequency is given by $FRQ_{pre}$/Cfrq. Even though the bit patterns are formed so that a zone has a same track recording density, just as with the embodiment, properly speaking, the bit frequency at the read head and the bit frequency at the write head are slightly different. The difference is ignored in this embodiment because $RW_{offset}$ is very small with respect to the writing/reading radius; however, it is possible to compensate the difference between the frequencies of the write head and the read head because the positions of the write head and read head may be calculated from the track numbers, $RW_{offset}$ and track pitch.

As for start timing of writing, when the read head and write head are in the same zone ($RW_{offset} \leq Dz-\alpha$), writing starts when the medium is moved by $Sep_{(N,N,S)}$ after detection of the sync. When the read head is in a different zone from the zone the write head is in ($RW_{offset} \geq Dz+\alpha$), writing starts when the medium has been moved by $Sep_{(N,N,S)}$. A symbol "S" denotes a data sector number. When the read head is in a different zone from the zone the write head is in, the timing between detection of the sync and a point of time when the writing starts varies according to sectors. Because of this, the time Sep between the detection of the sync and the start time of writing is expressed by a function of the zones in which the read head and write head are positioned and the data sector numbers.

The aforementioned α, Cfrq, write timing $Sep_{(N,N,S)}$ and $Sep_{(N,N+1,S)}$ after the sync are stored in the memory 21, as shown in FIG. 8, for every zone in which the write head is positioned and every zone in which the read head is positioned, and are referred by the timing controller 22 before a writing operation starts. The timing controller 22 searches the memory 21 for α, Cfrq, write timing after the sync corresponding to information about track numbers to be accessed, $RW_{offset}$ and Tp (track pitch), and data writing starts after the PLL 24 and write driver 27 adjust timing.

In the previous embodiment, the preamble pattern and sync pattern are formed with isolated bits in each track. However, upon positioning a write head on a recording track formed with the isolated bits, the read head may fall between tracks, causing possible deterioration of an SNR of reproduced signals of the preamble and sync. In addition, although a preamble pattern and sync pattern are arranged for each data sector on a medium, there is no need to always form the preamble pattern and sync pattern for all data sectors because writing operations are performed in synchronization with the medium in the present embodiment. The use of the medium shown in FIG. 9 enables the maintaining of SNR of preamble and sync signals, an improvement in formatting efficiency and simplification of compensation algorithm for write timing, according to some approaches.

Figure 9:
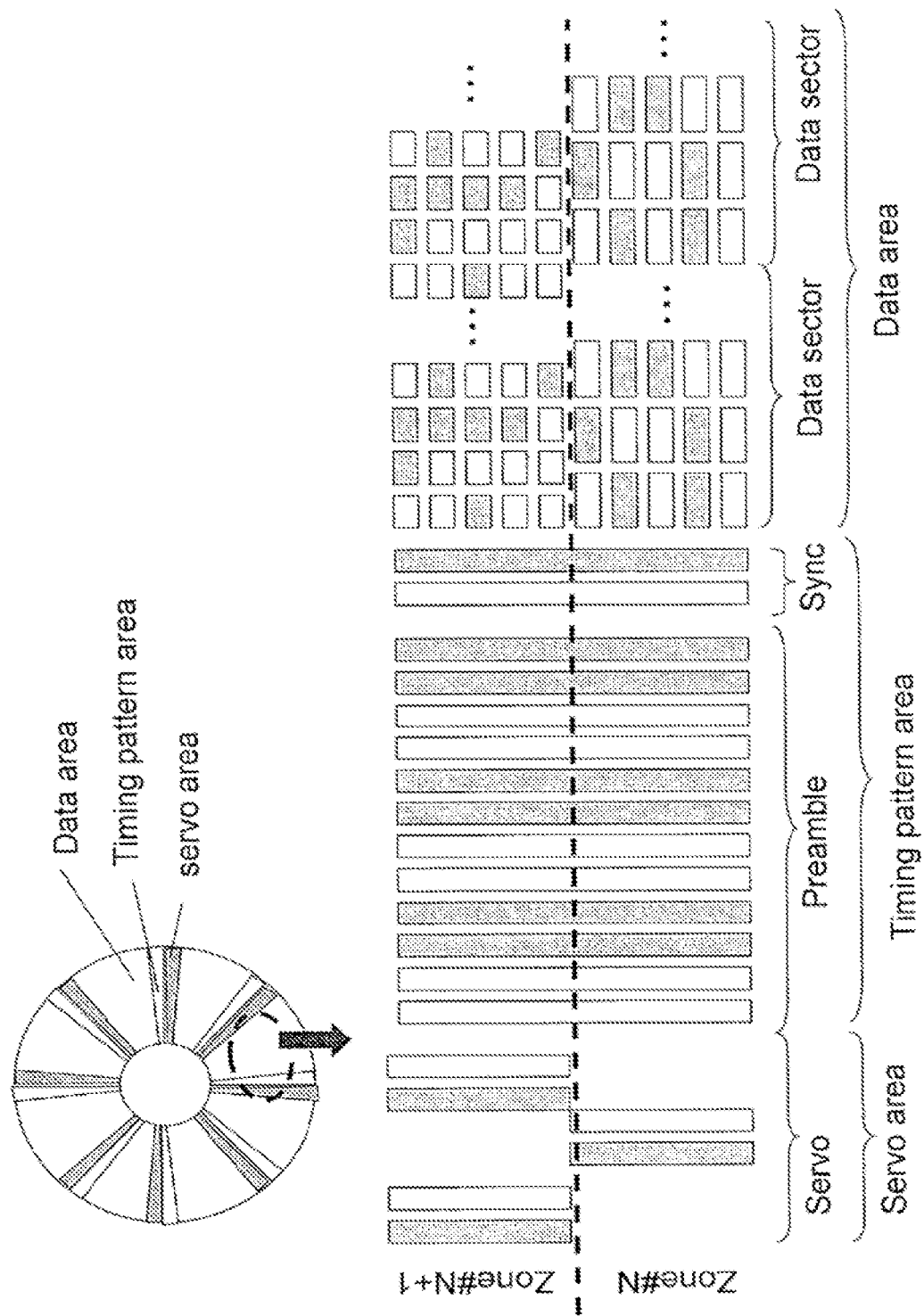
FIG. 9 illustrates an example of bit patterns on a medium, according to one embodiment.

In the patterned medium shown in FIG. 9, a plurality of servo sectors, which contain information used for positioning the head, are formed in the direction of the radius of the medium, and a preamble sector and sync sector are arranged after the servo sector. The preamble pattern and sync pattern, which are continuously formed patterns in the radius direction of the medium, are formed so that the frequencies in the reproduced waveforms of the preamble and sync become a fixed value in all zones. This may realize stable reproduction of the preamble and sync even if a read head is positioned on a boundary between zones. While the technique according to the previous embodiment sometimes cannot write data into tracks in the vicinity of the zone boundary, the technique according to the present embodiment may write data into all tracks.

Figure 10:
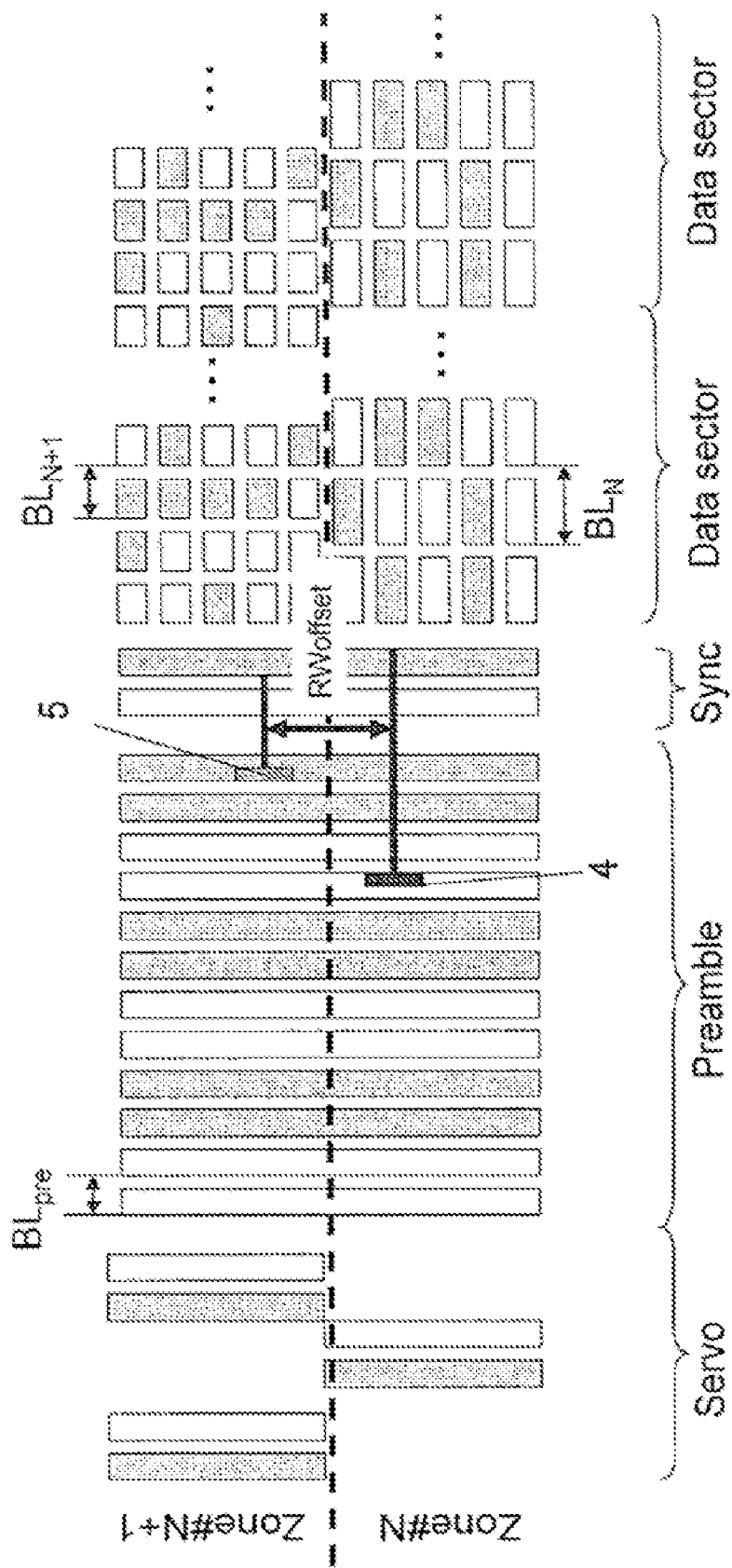
FIG. 10 is an exemplary view for explaining the calculation of a frequency compensation coefficient, according to one embodiment.

In this embodiment, as shown in FIG. 10, even when the write head 4, which is going to write data in Zone #N, is in the same zone as the read head 5 or is in the different zone from the read head 5, the compensation coefficient Cfrq of the write frequency is expressed by Equation 2 with the bit length $BL_{pre}$ and data bit length $BL_N$ of the preamble. Let the frequency acquired from a signal of the preamble be denoted as $FRQ_{pre}$, the write clock frequency is given by $FRQ_{pre}/Cfrq$.

$$Cfrq = BL_{pre}/BL_N \qquad \text{Equation 2}$$

Although the medium in this embodiment has bit patterns formed so that track recording densities in a zone are the same, a medium having bit patterns formed so that write frequencies in a zone are the same may be used. Alternatively, a medium may be used in which preamble patterns are formed so that the frequencies of the reproduced waveforms of preamble patterns are the same in all zones and bit patterns of data sectors are formed so that the track recording densities in a zone are constant.

Embodiments of the present invention are available to be used in magnetic

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording/reproducing device comprising:
    a patterned magnetic storage medium, including:
        a timing pattern area having a preamble pattern used to adjust at least one of write and read frequencies and a synchronization pattern used to adjust at least one of write and read phases, and
        a data area having a bit pattern used to store data;
    a medium driving unit for driving the patterned magnetic storage medium;
    a magnetic head having at least one of a write head and a read head; and
    a head driving unit for positioning the magnetic head at a desired track on the patterned magnetic storage medium,
    wherein the preamble pattern and the synchronization pattern in the timing pattern area are commonly used to at least one of write and read data, and
    wherein when the read head is positioned on a desired track containing data to be read and data is to be written on the desired track, the preamble pattern and the synchronization pattern are reproduced at the same position in the timing pattern area to adjust at least one of read timing and write timing based on a reproduced waveform of the preamble pattern and the synchronization pattern,
    wherein the patterned magnetic storage medium is divided into zones in a direction of a radius of the medium, each zone having a data area provided with a bit pattern formed at a constant recording density or write/read frequency,
    wherein a frequency acquired from a reproduced waveform of the preamble pattern is compensated by using a ratio to obtain a write frequency, the ratio being between a bit frequency of a zone where the read head is positioned and a bit frequency of a zone where the write head is positioned, and
    wherein a writing operation is performed on the data area based at least in part on the write frequency.

2. The magnetic recording/reproducing device according to claim 1, wherein memory storing compensation amounts are provided for the write frequency, the memory storing compensation amounts corresponding to a zone in which the read head is positioned and a zone in which the write head is positioned.

3. The magnetic recording/reproducing device according to claim 1, wherein when the read head is positioned in a vicinity of a boundary of zones at a time of writing data and when accurate frequency information cannot be obtained because the preamble patterns in zones adjacent to the read head are simultaneously being reproduced, a track where the write head is currently positioned is defined as a write inhibited track.

4. The magnetic recording/reproducing device according to claim 1, wherein a track recording density or a read signal frequency of the preamble pattern and the synchronization pattern are equal across all zones.

5. The magnetic recording/reproducing device according to claim 4, wherein the preamble pattern and the synchronization pattern comprise bit patterns that are continuous and unbroken in a width direction of a track.

6. The magnetic recording/reproducing device according to claim 4, wherein a write clock frequency is compensated with a ratio and a writing operation is performed based on the compensated frequency, the ratio being between a bit length of the preamble pattern of a track at which the read head is positioned and a bit length of a data area at which the write head is positioned.

7. The magnetic recording/reproducing device according to claim 6, wherein memory storing compensation amounts for the write clock frequency are provided, the memory storing compensation amounts corresponding to a zone in which the read head is positioned and a zone in which the write head is positioned.

8. A method, comprising:
    commonly using a preamble pattern and a synchronization pattern in a timing, pattern of a patterned magnetic storage medium to at least one of write and read data; and
    reproducing the preamble pattern and the synchronization pattern at the same position in the timing pattern area to adjust at least one of read timing and write timing based on a reproduced waveform of the preamble pattern and the synchronization pattern when a read head is positioned on a desired track containing data to be read and data is to be written on the desired track,
    wherein the patterned magnetic storage medium is divided into zones in a direction of a radius of the medium, each zone having a data area provided with a bit pattern formed at a constant recording density or write/read frequency, wherein a frequency acquired from a reproduced waveform of the preamble pattern is compensated by using a ratio to obtain a write frequency, the ratio being between a bit frequency of a zone where the read head is positioned and a bit frequency of a zone where the write head is positioned, and wherein a writing operation is performed on the data area based at least in part on the write frequency.

9. The method according to claim 8, wherein memory storing compensation amounts are provided for the write frequency, the memory storing compensation amounts corresponding to a zone in which the read head is positioned and a zone in which the write head is positioned.

10. The method according to claim 8, wherein when the read head is positioned in a vicinity of a boundary of zones at a time of writing data and when accurate frequency information cannot be obtained because the preamble patterns in zones adjacent to the read head are simultaneously being reproduced, a track where the write head is currently positioned is defined as a write inhibited track.

11. The method according to claim 8, wherein a track recording density or a read signal frequency of the preamble pattern and the synchronization pattern are equal across all zones.

12. The method according to claim 11, wherein the preamble pattern and the synchronization pattern comprise bit patterns that are continuous and unbroken in a width direction of a track.

13. The method according to claim 11, wherein a write clock frequency is compensated with a ratio and a writing operation is performed based on the compensated frequency, the ratio being between a bit length of the preamble pattern of a track at which the read head is positioned and a bit length of a data area at which the write head is positioned.

14. The method according to claim 13, wherein memory storing compensation amounts for the write clock frequency are provided, the memory storing compensation amounts corresponding to a zone in which the read head is positioned and a zone in which the write head is positioned.

15. A magnetic recording/reproducing device comprising:
a patterned magnetic storage medium, including:
  a timing pattern area having a preamble pattern used to adjust write and/or read frequencies and a synchronization pattern used to adjust at least one of write and read phases, and
  a data area having a bit pattern for storing data;
a medium driving unit for driving the patterned magnetic storage medium;
a magnetic head having at least a write head and a read head;
a head driving unit for positioning the magnetic head at a desired track on the patterned magnetic storage medium;
logic for commonly using the preamble pattern and the synchronization pattern in the timing pattern area when at least one of writing and reading data, and
logic for causing reproduction of the preamble pattern and the synchronization pattern at the same position in the timing pattern area to adjust at least one of read timing and write timing based on a reproduced waveform of the preamble pattern and the synchronization pattern when the read head is positioned on a desired track containing data to be read and data is to be written on the desired track,
wherein the patterned magnetic storage medium is divided into zones in a direction of a radius of the medium, each zone having a data area provided with a bit pattern formed at a constant recording density or write/read frequency,
wherein a frequency acquired from a reproduced waveform of the preamble pattern is compensated by using a ratio to obtain a write frequency, the ratio being between a bit frequency of a zone where the read head is positioned and a bit frequency of a zone where the write head is positioned, and
wherein a writing operation is performed on the data area based at least in part on the write frequency.

16. The magnetic recording/reproducing device according to claim 15, wherein memory storing compensation amounts are provided for the write frequency, the memory storing compensation amounts corresponding to a zone in which the read head is positioned and a zone in which the write head is positioned.

17. The magnetic recording/reproducing device according to claim 15, further comprising logic for defining a track where the write head is currently positioned as a write inhibited track when the read head is positioned in a vicinity of a boundary of zones at a time of writing data and when accurate frequency information cannot be obtained because the preamble patterns in zones adjacent to the read head are simultaneously being reproduced.

18. The magnetic recording/reproducing device according to claim 15, wherein a track recording density or a read signal frequency of the preamble pattern and the synchronization pattern are equal across all zones.

* * * * *

UNITED STATES PATENT AND TRADEMARK OFFICE
CERTIFICATE OF CORRECTION

PATENT NO.      : 8,169,729 B2
APPLICATION NO. : 12/635629
DATED           : May 1, 2012
INVENTOR(S)     : Zaitsu et al.

It is certified that error appears in the above-identified patent and that said Letters Patent is hereby corrected as shown below:

col. 4, line 11, replace "art" with --an--;

col. 4, line 28, replace "he" with --be--;

col. 6, line 23, replace "median" with --medium--.

col. 10, line 47, replace "timing," with --timing--.

Signed and Sealed this
Twenty-first Day of August, 2012

David J. Kappos
*Director of the United States Patent and Trademark Office*